United States Patent [19]
Iarossi et al.

[11] 3,785,318
[45] Jan. 15, 1974

[54] DOCKING AND DRYDOCKING MEMBERS FOR EXTERNALLY INSULATED SHIPS

[75] Inventors: Frank J. Iarossi, Middletown, N.J.; Walter C. Cowles, Cobhan, England

[73] Assignee: Esso Research and Engineering Company, Linden, N.J.

[22] Filed: May 18, 1971

[21] Appl. No.: 144,421

[52] U.S. Cl. ............ 114/74 A, 114/219, 220/9 LG
[51] Int. Cl. ............................................ B63b 25/16
[58] Field of Search ............... 114/72, 73, 79, 74 R, 114/74 A, 219, 220, 65 R, 65 A; 220/9 LG, 9 R, 9 A, 14, 15

[56] References Cited
UNITED STATES PATENTS

| | | | |
|---|---|---|---|
| 3,283,734 | 11/1966 | Gorman | 114/74 A |
| 3,071,094 | 1/1963 | Leroux | 114/74 A |
| 3,418,815 | 12/1968 | Kumazawa | 114/219 X |
| 1,268,244 | 6/1918 | Henley | 114/219 X |
| 2,890,880 | 6/1959 | Hompe et al. | 114/219 X |

FOREIGN PATENTS OR APPLICATIONS 1,062,454   12/1953   France ............................. 114/219

Primary Examiner—George E. A. Halvosa
Assistant Examiner—Edward R. Kazenske
Attorney—Manahan and Wohlers and F. Donald Paris

[57] ABSTRACT

An arrangement and construction for longitudinal extending bearing members disposed within the external insulation and attached to the hull of an externally insulated tanker for transferring impact loads such as may result from docking and drydocking through the insulation to the ship's structure. These longitudinal bearing members are made from a material such as balsa or hard rubber which possesses high compressive strength and are disposed along the sides and bottom of the ship's hull.

6 Claims, 6 Drawing Figures

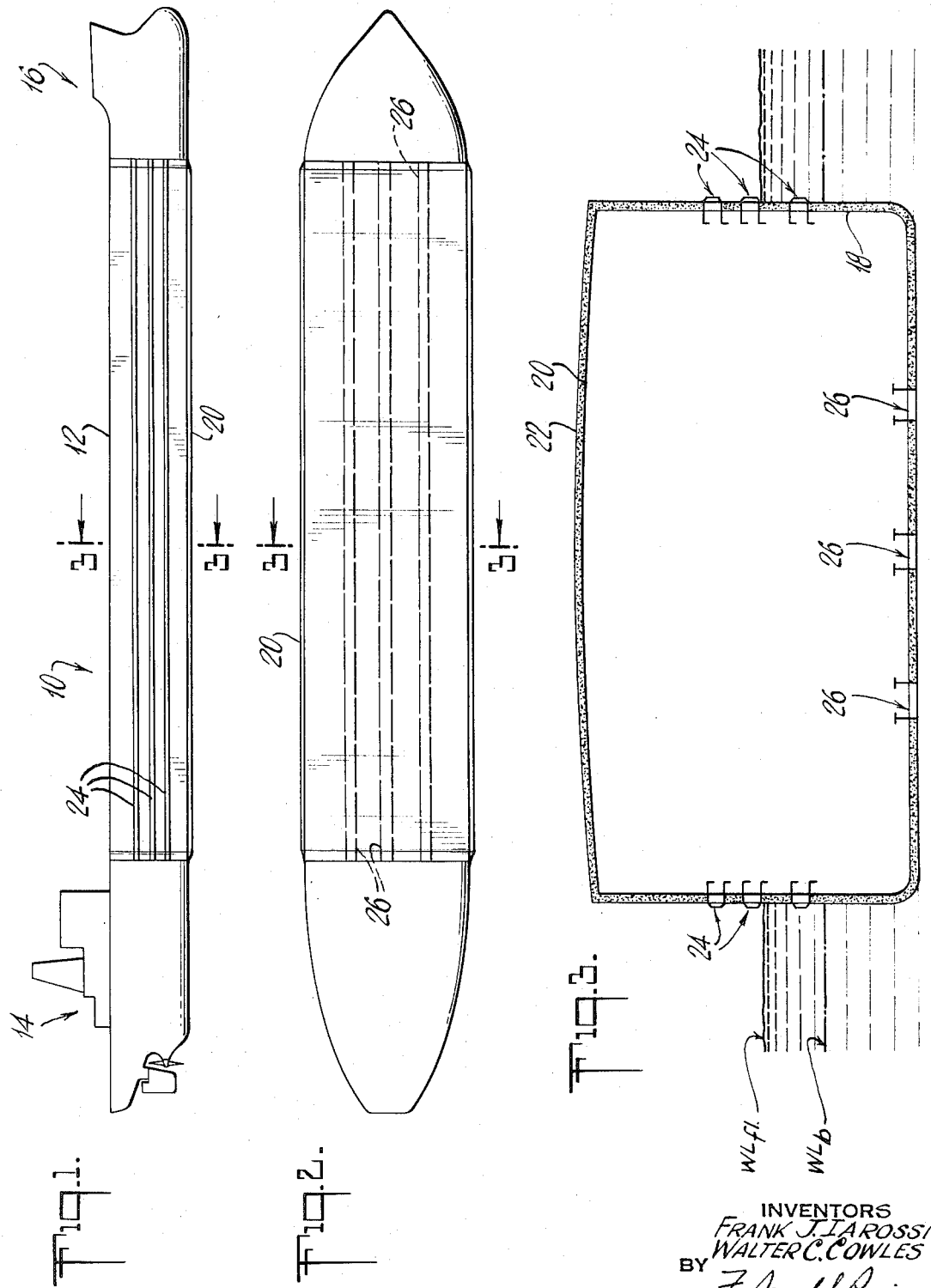

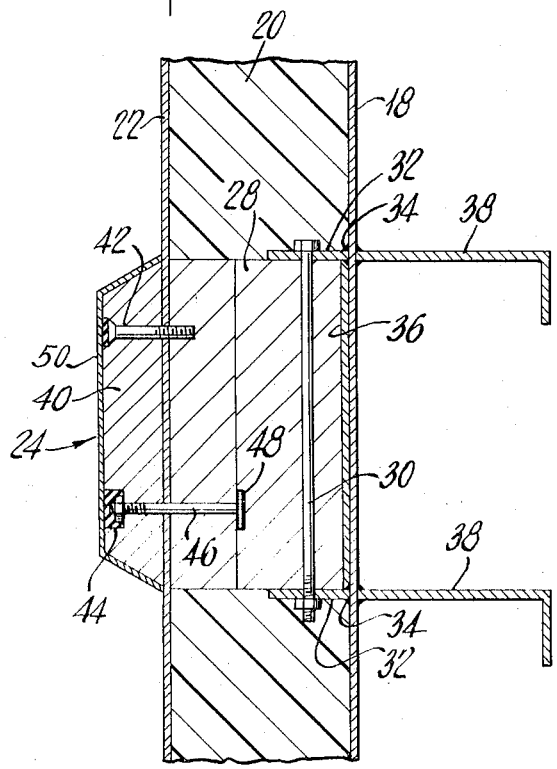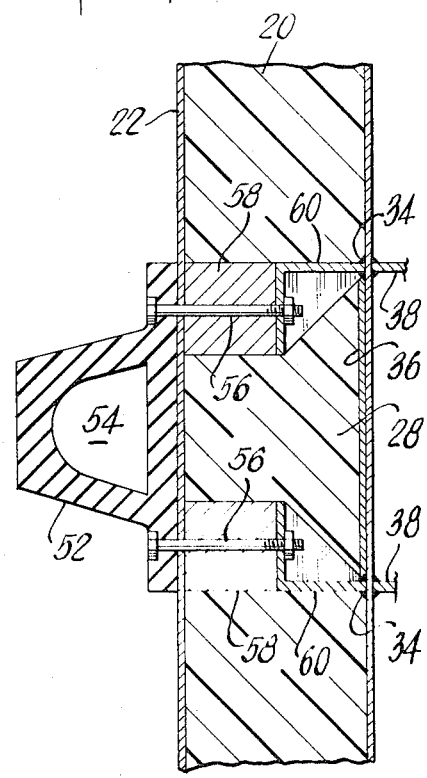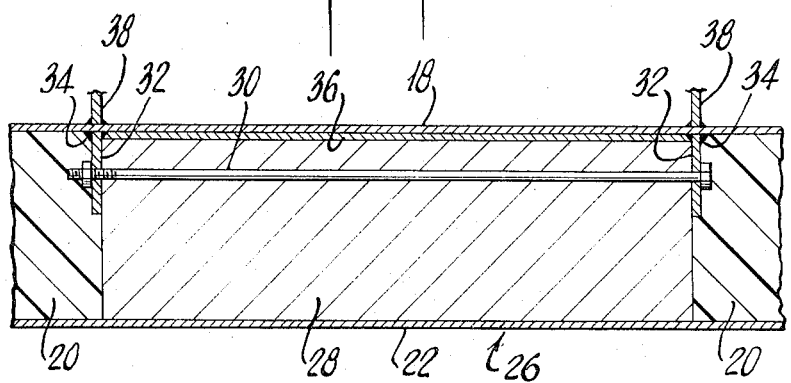

DOCKING AND DRYDOCKING MEMBERS FOR EXTERNALLY INSULATED SHIPS

CROSS-REFERENCE TO RELATED APPLICATIONS AND PATENTS

The present invention has utility typically in an externally insulated ship such as disclosed in the Gorman U.S. Pat. No. 3,283,734, assigned to the same assignee to which the present application is assigned and in U.S. Pat. application Ser. No. 144,422, filed May 18, 1971 entitled GRID SYSTEM FOR EXTERNAL INSULATION, which discloses an arrangement and construction for securing external insulation to the ship's hull and which latter application is assigned to the same assignee as that of the present application.

BACKGROUND OF THE INVENTION

The present invention relates to liquid-carrying tankers and more particularly to an externally insulated LNG tanker wherein the tanker may comprise a single shell internally stiffened both longitudinally and transversely with cargo sections subdivided into tank spaces by longitudinal and transverse bulkheads with the tanker shell forming the outer tank boundary. One such typical externally insulated tanker is found in the aforementioned U.S. Pat. No. 3,283,734, which discloses in a very broad sense only the use of plastic keel and bilge blocks and plastic or metal rub rails disposed along the sides of the vessels. However, no details concerning the construction and arrangement of such members is disclosed therein.

The present invention is directed towards providing a novel construction and arrangement for docking and drydocking members for an externally insulated ship. Such members typically may comprise longitudinal bearing members made from a material, such as balsa or hard rubber or the like, possessing high compressive strength with the members being attached to the hull of the externally insulated tanker so as to transfer impact loads through the insulation to the ship's structure.

In a preferred embodiment a plurality of such bearing members would be longitudinally disposed along the sides and bottom of the vessel with the side members extending beyond an outer protective covering disposed over the insulation and being spaced from slightly above the ballast waterline to well above the full load waterline. In order to provide complete protection during docking operations, three or more such side members may be required. A typical construction might comprise the inner bearing member being the same thickness as the external insulation and being fixed to the hull preferably by means of bolting to flat bars welded to the ship's hull. A silicon bedding compound may be used to fair and seal the member to the hull interface. It is important that this inner member be comprised from material possessing good insulating properties and high compressive strength. Exemplary of such materials are end grain balsa, oak, rubber composition, or a high density, closed cell foam. The outer protective covering or vapor barrier extends over the insulation as well as the inner bearing member. There also is provided an outer bearing member located external to the outer covering and suitably fastened to the inner member. This outer member preferably is of a lesser compressive strength than the inner bearing member so that it will fail prior to the inner member being damaged. The outer member is fastened in such a manner that it can be easily removed and replaced. A typical construction of inner and outermembers would be to use a high density balsa for the former and balsa of a slightly lower density for the outer member. The balsa may be faced with a fiber glass lamina to provide better abrasion and permeability qualities. The bearing members disposed along the ship's bottom need only comprise an inner member designed to be flush with the external insulation and spaced to match the position of the drydock keel and bilge blocks. Various alternate embodiments are contemplated such as where the outer bearing member has an energy absorption type construction.

Thus, it is a primary object of the present invention to provide a novel construction and arrangement for an externally insulated tanker that will transfer impact loads through the insulation to the ship's structure.

Having in mind this and various other objects that will be evident from an understanding of this disclosure, the present invention comprises the combinations and arrangements as illustrated in the presently preferred embodiment of the invention, which is hereinafter set forth in such detail as to enable those skilled in the art readily to understand the function, operation, construction and advantages of it when read in conjunction with the accompanying drawings.

BRIEF DESCRIPTION OF THE DRAWINGS

FIG. 1 is an outboard profile view of an externally insulated tanker incorporating the present invention;

FIG. 2 is a bottom plan view of the externally insulated tanker of FIG. 1;

FIG. 3 is an enlarged cross-sectional view taken substantially on the line 3—3 of FIGS. 1 and 2 illustrating an overall schematic arrangement of the present invention;

FIG. 4 is an enlarged detailed cross-sectional view of a side bearing member illustrating two different arrangements for securing the outer bearing member to the inner bearing member;

FIG. 5 illustrates an alternate embodiment to that shown in FIG. 4; and

FIG. 6 illustrates a detail constructional view of a bottom bearing member constructed in accordance with the teachings of the present invention.

DESCRIPTION OF THE PREFERRED EMBODIMENT

Having reference to the drawings wherein the present invention is illustrated in FIG. 1 as embodied in an externally insulated tanker typically having a nickel-steel plate hull at its midbody with reference being made to the aforementioned U.S. Gorman Pat. No. 3,283,734 for a more complete and detailed explanation thereof. Also, reference may be had to the aforementioned U.S. Pat. application Ser. No. 144,422 for details as to the securement of the external insulation to the ship's hull.

FIGS. 1, 2 and 3 illustrate a tanker 10 including a cargo-carrying midbody 12, a stern 14, and a forward hull portion or bow 16. The stern and the bow are fabricated conventionally from mild steel plate and mild steel strengthening members. In accordance with the teachings of the aforementioned Gorman patent, the cargo-carrying midbody of the vessel may be fabricated from a metal hull plating 18 that possesses the physical and mechanical properties compatible with the particular cargo to be carried. Thus, a typical material for an LNG tanker might comprise nickel-steel containing substantially 9 percent nickel. Although not shown, the midbody 12 may be divided into a plurality of individual cargo hulls by means of transverse bulkheads and longitudinal bulkheads; but, in any event, the midbody is completely enveloped or clad externally with a suitable external insulation 20. The external insulation 20 is provided with an outer protective covering 22 which is both water-resistant and abrasion-resistant.

According to the present invention, there is provided a plurality of longitudinally extending side bearing members 24 which extend slightly beyond the outer covering 22 and are spaced slightly above the ballast waterline $WL_b$ to well above the full load waterline $WL_{fl}$ so that in either condition adequate protection is provided to transfer any impact loads. Also there are provided a plurality of longitudinally extending bearing members 26 along the bottom of the vessel which are constructed and arranged so as to terminate substantially flush with the outer surface of the insulation 20. As shown in FIG. 4, the side bearing members 24 comprise an inner bearing member 28 secured to the hull plating 18 by means of a plurality of nickel steel or stainless steel bolts 30, which extend perpendicular to the direction of the member 28, passing through a pair of vertically spaced flat bars 32 which are welded as shown at 34 or otherwise suitably secured to the hull plating 18. The bolt passes through predrilled holes in the inner bearing member and is secured in place by conventional means. An alternate arrangement to the foregoing is to provide a single flat bar centrally disposed of the inner member 28 for receiving the bolt 30. In either alternative a bedding compound 36 such as silicon is provided to fair and seal the member 28 to the hull interface. As shown, the flat bars 32 are disposed in substantially the same plane as the internal angle stiffeners 38 of the ship's hull in order to provide the desired strength and rigidity for receiving any impact. In the case of the side bearing members there is provided an outer bearing member 40 which extends beyond the outer covering 22 (as shown in FIGS. 3 and 4) and is designed to be easily removed and replaced by means of fastening the member 40 to the inner bearing member 28 by means of a screw type fastener 42 which is countersunk and filled in at the head by a suitable filler material 44 such as silicon or the like. An alternate arrangement for securing the outer bearing member 40 to the inner member 28 is by means of a bolt type fastener 46 secured within the inner member 28 or threaded into an apertured plate member 48 operably secured with the inner member 28. The outer member 40 is provided with an outer layer 50 such as reinforced fiberglass lamina to provide for better abrasion and permeability characteristics. As illustrated, the outer member 40 is trapezoidal in shape; however, various other suitable shapes may be utilized.

FIG. 6 shows details of the bottom bearing members 26. These members are positioned longitudinally and transversely such that they will contact the docking blocks in a drydock. Since these members do not receive the impact load that is applied to the side bearing members, there is no necessity for employing an outer member such as 40 employed in the case of the side bearing members. As in the case of the side bearing members the bottom members 26 each comprise an inner member 28 which is fastened to the hull plating 18 in the same manner as is the inner bearing member discussed in connection with the side members illustrated in FIG. 4.

An alternate arrangement and construction to that shown in FIG. 4 is illustrated in FIG. 5 wherein there is provided a partially hollow absorption outer bearing member or fender 52. The member 52 is trapezoidal in shape and preferably is made of a reinforced rubber composition. This fender 52 is closed-ended and is provided throughout its length with a central space 54 which may be filled with air or a gaseous material to provide the necessary absorption qualities. As the member 52 receives an impact load, it compresses the fender 52 to high compressive strength insulating blocks 58 disposed within and flush with the outer surface of the insulation 20. The outer covering is disposed between the fender 52 and the insulation and the blocks. These blocks 58 are secured to the hull plating 18 of the ship by means of L-shaped nickel steel angle members 60 welded as shown at 34 to the hull. As in the case of the flat bars 32 shown in FIG. 4, these members 60 are disposed in substantially the same plane as the internal angle stiffeners 38 of the ship's hull to provide for greater strength and rigidity to withstand impact loads.

It will be appreciated from the foregoing description that there has been provided a novel and improved construction and arrangement for docking and drydocking members for an externally insulated ship. However, it should be understood that the specific constructions and arrangements herein illustrated and described are intended to be representative of a preferred embodiment only, and that certain changes may be made therein without departing from the clear teachings of the present disclosure. For example, the docking and drydocking bearing members although shown and described as each comprising a plurality of separate members can comprise a single unitary member on either side and on the bottom of the tanker. Accordingly, reference should be made to the following appended claims in determining the full scope of the invention.

Having thus set forth the nature of the invention, what is claimed herein is:

1. An externally insulated tanker for the transportation of liquid cargoes comprising, in combination, a hull having forward and after portions interconnected by a cargo-carrying midbody portion having sides and a bottom, thermal insulation means secured to the exterior of said hull, longitudinally extending bearing means disposed on each of said sides and said bottom for transferring impact loads that may result from the docking and drydocking of said tanker through said external insulation to the tanker's internal supporting structure, said side bearing means being disposed so as to be operable both during full load and ballast condition of said tanker, said side bearing means comprising an inner bearing member and an outer bearing member secured to and having less compressive strength than said inner bearing member, sealant means disposed between said inner bearing member and said hull, and means for operably securing said inner bearing means to said hull.

2. An externally insulated tanker according to claim 1 wherein there are provided a plurality of vertically spaced outward extending apertured bars secured to the hull of said tanker, said bars being located at the top and bottom of each of said inner bearing members, and a bolt extending, through corresponding ones of said bearing members and said bars for securing said member to said hull.

3. An externally insulated tanker according to claim 1 wherein said outer member is constructed and arranged for the absorption of energy such that as an impact load is applied thereto said outer member is compressed thereby to transmit the impact load through the inner member to the tanker's internal structure.

4. An externally insulated tanker according to claim 3 wherein said outer member comprises a partially hollow trapezoidal shaped closed-ended configuration and said inner member comprises insulating blocks disposed within said thermal insulation means.

5. An externally insulated tanker for the transportation of liquid cargoes comprising, in combination, a hull having forward and after portions interconnected by a cargo-carrying midbody portion having sides and a bottom, thermal insulation means secured to the exterior of said cargo-carrying midbody, longitudinally extending bearing means disposed on each of said sides and said bottom for transferring impact loads that may result from the docking and drydocking of said tanker through said external insulation to the tanker's internal supporting structure, said bearing means on said sides being disposed so as to be operable during full load and ballast condition of said tanker, said bearing means on said sides comprising an inner-bearing member and an outer-bearing member secured to and having less compressive strength than said inner-bearing member, sealant means disposed between said inner-bearing member and said hull, means for operably securing said inner-bearing means to said hull, and a layer having abrasion-resistant and permeability qualities disposed over said outer-bearing member.

6. An externally insulated tanker for the transportation of liquid cargoes comprising, in combination, a hull having forward and after portions interconnected by a cargo-carrying midbody portion having sides and a bottom, thermal insulation means secured to the exterior of said cargo-carrying midbody, longitudinally extending bearing means disposed on each of said sides and said bottom for transferring impact loads that may result from the docking and drydocking of said tanker through said external insulation of the tanker's internal supporting structure, said bearing means on said sides being disposed so as to be operable during full load and ballast condition of said tanker, said bearing means on said sides comprising an inner-bearing member and an outer-bearing member secured to and having less compressive strength than said inner-bearing member, sealant means disposed between said inner-bearing member and said hull, means for operably securing said inner-bearing means to said hull, a plurality of vertically spaced outward extending apertured bars secured to the hull of said tanker, said bars being located at the top and bottom of each of said inner-bearing members, a bolt extending through corresponding ones of said bearing members and said bars for securing said members to said hull, and internal stiffening members disposed in substantially horizontal alignment with said bars.

* * * * *